United States Patent [19]

Thrush

[11] 3,832,007
[45] Aug. 27, 1974

[54] BLEND BACK PROPORTIONING VALVE

[75] Inventor: Richard G. Thrush, Cleveland, Ohio

[73] Assignee: The Weatherhead Company, Cleveland, Ohio

[22] Filed: July 17, 1973

[21] Appl. No.: 379,931

[52] U.S. Cl. .............................................. 303/6 C
[51] Int. Cl. ............................................ B60t 11/34
[58] Field of Search ...................... 303/6 C; 188/349

[56] References Cited
UNITED STATES PATENTS

| | | | |
|---|---|---|---|
| 3,667,810 | 6/1972 | Silagy | 188/349 |
| 3,721,473 | 3/1973 | Budzich | 303/6 C |
| 3,727,991 | 4/1973 | DeHoff et al. | 188/349 |
| 3,776,603 | 12/1973 | Bueler | 303/6 C |

*Primary Examiner*—Duane A. Reger
*Assistant Examiner*—Jesus D. Sotelo
*Attorney, Agent, or Firm*—Farrington, Pearne & Gordon McNenny

[57] ABSTRACT

A motor vehicle hydraulic brake system which includes a front brake circuit and a rear brake circuit. The rear brake circuit includes a blend back proportioning valve which controls the pressure in the rear brake circuit. The blend back proportioning valve includes a pressure reducing sleeve and a pressure intensifying piston. The pressure reducing sleeve in conjunction with the pressure intensifying piston maintains increases in rear brake pressure proportional to but less than increases in master cylinder pressure between a first predetermined pressure and a second predetermined pressure. The pressure intensifying piston independently of the pressure reducing sleeve maintains increases in rear brake pressure proportional to but greater than increases in master cyclinder pressure between the second predetermined pressure and a third predetermined pressure.

17 Claims, 3 Drawing Figures

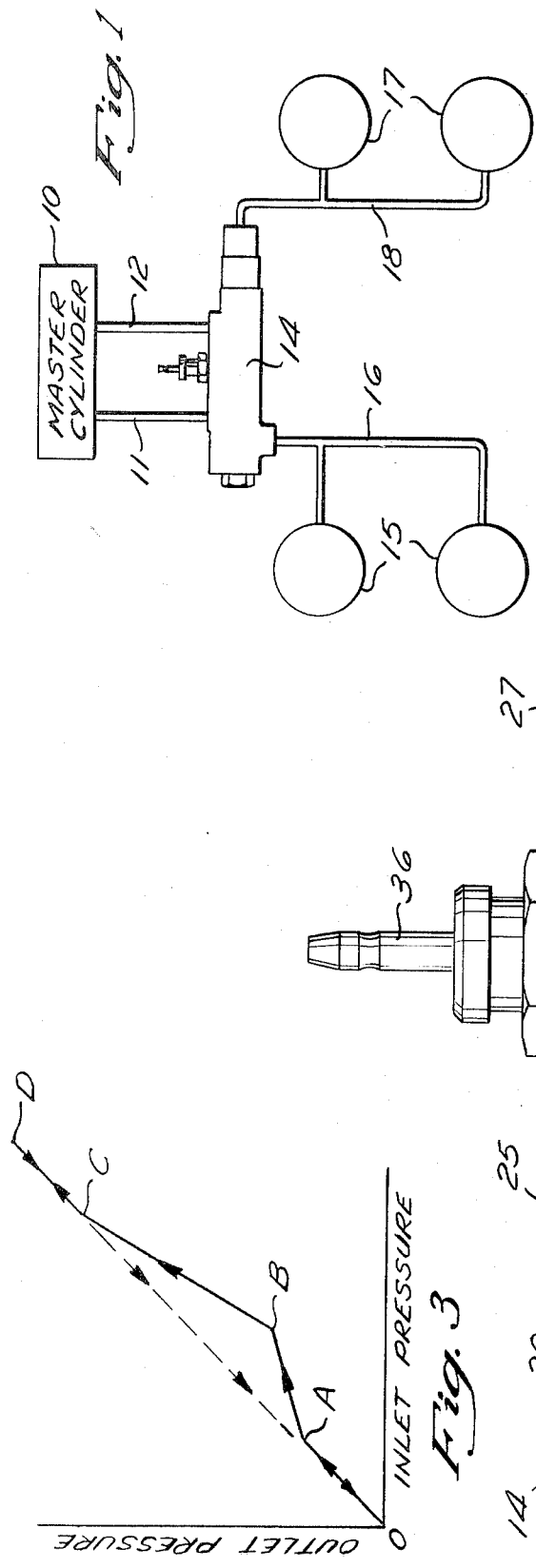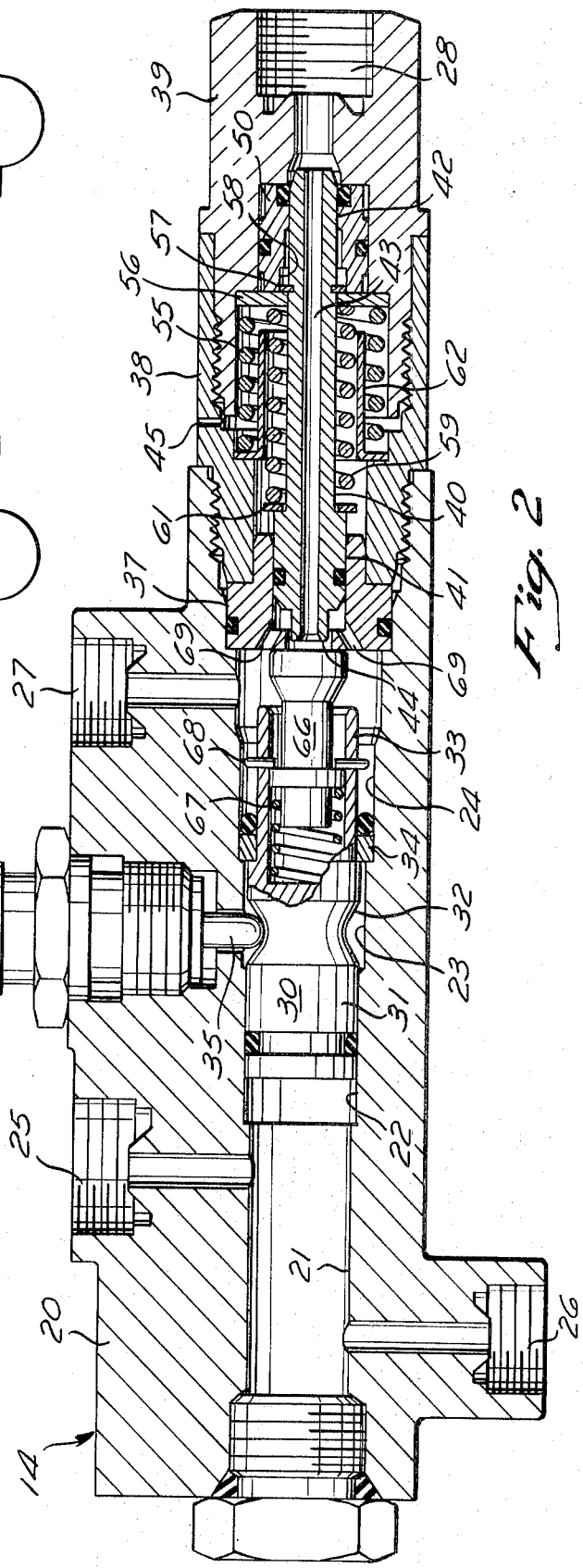

3,832,007

BLEND BACK PROPORTIONING VALVE

BACKGROUND OF THE INVENTION

Hydraulic brake systems for motor vehicles are commonly dual systems in which the front brake circuit is hydraulically isolated from the rear brake circuit so that a failure in one of the circuits does not impede operation of the other circuit. It has been recognized that, due to weight transfer of the vehicle from the rear wheels to the front wheels during braking, it is desirable to provide a lower pressure to the rear wheel brakes than is provided to the front wheel brakes. To provide this function, a fluid pressure proportioning valve is sometimes placed in the rear brake circuit between the master cylinder and the slave cylinders of the rear wheel brakes to maintain increases in the rear wheel brake pressure proportional to but less than increases in the front wheel brake pressure. One such prior art proportioning valve is disclosed in U.S. Letters Pat. No. 3,623,776 to Ellis M. Wellman, and another is disclosed in U.S. Letters Pat. No. 3,667,810 to Richard J. Silagy.

It has also been recognized in the art that, under certain conditions, it is desirable to equalize the rear brake pressure with the front brake pressure under very severe braking conditions. To perform this function, the art has provided various blend back proportioning valves which reduce the fluid pressure increases in the rear brake pressure over one range of pressures and which equalize front and rear brake pressures under very high braking pressures.

SUMMARY OF THE INVENTION

The present invention provides a novel blend back proportioning valve. The valve includes a housing having a bore therein, an inlet port, and an outlet port. A pressure intensifying piston is slidably disposed in the bore between the inlet port and the outlet port, and a fluid flow passage extends axially from one end of the pressure intensifying piston to establish fluid pressure communication between the inlet port and the outlet port. The pressure intensifying piston includes a larger diameter portion exposed to inlet port pressure and a smaller diameter portion exposed to outlet port pressure. An annular pressure reducing sleeve is also slidably disposed in the bore and has one end exposed to outlet port pressure and the other end exposed to atmospheric pressure.

A first spring urges the pressure reducing sleeve and the pressure intensifying piston toward the outlet port, and a second spring acts between the pressure intensifying piston and the pressure reducing sleeve to urge the pressure intensifying piston toward the inlet port. A valve seat is slidably disposed in the bore and is spring biased by a third spring to a position in the bore spaced from the one end of the pressure intensifying piston.

The pressure reducing sleeve pushes the pressure intensifying piston in a direction toward the inlet port against the bias of the first spring when a first predetermined pressure is reached in the inlet port and maintains increases in outlet port pressure proportional to but less than increases in inlet port pressure when the inlet port pressure is greater than a first predetermined inlet port pressure and less than a second predetermined inlet port pressure. When the second predetermined inlet port pressure is reached, the pressure intensifying piston moves against a predetermined preload of the second spring and maintains increases in outlet port pressure proportional to but greater than increases in inlet port pressure when the inlet port pressure is greater than the second predetermined inlet port pressure and less than a third predetermined inlet port pressure.

When the inlet port pressure exceeds the third predetermined inlet port pressure, the valve seat moves against the bias of the third spring away from the one end of the pressure intensifying piston to prevent the pressure intensifying piston from intensifying the rear wheel brake pressure above the front brake pressure.

BRIEF DESCRIPTION OF THE DRAWINGS

These and other aspects, principles and advantages of the present invention are incorporated in the preferred embodiment of the invention shown in the drawings, wherein:

FIG. 1 is a schematic circuit diagram of a motor vehicle hydraulic brake system according to the principles of the invention;

FIG. 2 is an enlarged, side elevational, cross-sectional view of the blend back proportioning valve used in the system shown in FIG. 1; and FIG. 3 is a graphical representation of the relationship between inlet and outlet pressures of the blend back proportioning valve shown in FIGS. 1 and 2.

DESCRIPTION OF THE PREFERRED EMBODIMENT

Referring to the drawings in greater detail, the schematic circuit diagram shown in FIG. 1 includes a dual master cylinder 10 having a front brake circuit supply line 11 and a rear brake circuit supply line 12 for separately supplying fluid pressure to the front brake circuit and the rear brake circuit. The pressure in the lines 11 and 12 is equal under all operating conditions except when there is a failure in either the front brake circuit or the rear brake circuit. The lines 11 and 12 lead to a combination warning switch and blend back proportioning valve 14, and the combination unit 14 supplies fluid pressure to the slave cylinders of the front wheels 15 through the line 16 and to the slave cylinders of the rear wheels 17 through a line 18.

As shown in FIG. 2, the combination unit 14 includes a housing 20 which is preferably machined from extruded brass stock. A stepped bore 21 extends axially from end to end through the housing 20, and the bore 21 includes a smaller diameter portion 22, an intermediate diameter portion 23, and a larger diameter portion 24. On the left side of the housing 20, a front brake inlet port 25 is hydraulically connected to the front brake supply line 11, and a front brake outlet port 26 is hydraulically connected to the line 16. On the right side of the housing 20, a rear brake inlet port 27 is hydraulically connected to the rear brake supply line 12 and a rear brake outlet port 28 is hydraulically connected to the line 18.

A single piece warning switch piston 30 is slidably disposed in the axial bore 21. The warning switch piston 30 includes a left portion 31 sealingly disposed in the smaller diameter portion 22, a reduced diameter central portion 32, and a right portion 33. An annular centering sleeve 34 is slidably disposed in the larger diameter bore portion 24 and is slidable axially relative to the warning switch piston 30. Suitable seals are provided to prevent fluid leakage between left portion 31 and the smaller diameter bore portion 22 and between the right portion 33 and the larger diameter bore portion 24.

The warning switch piston 30 operates in a well known manner. The pressures in the front brake inlet port 25 and the rear brake inlet port 27 are equal under all conditions except when there is a failure in either the front brake circuit or the rear brake circuit. Under these normal operating conditions, the equal pressures acting on the left piston portion 31 and on the right piston portion 33 and on the centering sleeve 34 hold the warning switch piston 30 in the position shown in FIG. 2. This is because the area exposed to fluid pressure acting to the left on the warning switch piston 30 is the sum of the lateral cross-sectional area of the portion 33 and the lateral cross-sectional area of the sleeve 34. This area is greater than the area of the piston portion 31 acting to the right on the warning switch piston 30, so that the warning switch piston 30 and the sleeve 34 are urged to the left as viewed in FIG. 2. However, the sleeve 34 engages a shoulder at the junction of the bore portions 23 and 24 to prevent such leftward movement so that the switch piston 30 is held in its center position shown in FIG. 2.

If there is a failure in the front circuit, the rear brake pressure acting on the right end portion 33 will move the switch piston 30 to the left as viewed in FIG. 2. The sleeve 34 does not move to the left with the switch piston 30 because movement of the sleeve 34 to the left is prevented by the shoulder at the junction of the bore portions 23 and 24. This causes a warning switch plunger 35 to move upwardly out of the reduced diameter center portion 32. This upward movement of the plunger 35 electrically connects a warning switch terminal 36 to a ground connection through the housing 20. The terminal 36, in a well known manner, is electrically connected to the ground side of a warning indicator (not shown) so that such upward movement of the plunger 35 actuates the warning indicator. After the front brake circuit has been repaired, so that equal pressures are supplied again to the inlet ports 25 and 27, such pressures move the warning switch piston 30 back to the center position shown in FIG. 2 because the lateral cross-sectional area of the left portion 31 is greater than the lateral cross-sectional area of the right portion 33. This causes the plunger 35 to again move to the reduced diameter center portion 32 to deactuate the warning indicator.

In a similar manner, when there is a failure in the rear circuit, the pressure in the front circuit acts against the left end portion 31 and pushes the switch piston 30 and sleeve 34 to the right to actuate the warning indicator. After the rear circuit has been repaired so that the pressures supplied to the inlet ports 25 and 27 are equal, the switch piston 30 is moved back to the center position shown in FIG. 2 because the lateral cross-sectional area of the sleeve 34 plus the lateral cross-sectional area of the right end portion 33 is greater than the lateral cross-sectional area of the left end portion 31.

The right side of the housing 20 as viewed in FIG. 2 includes a first insert 37, a second insert 38, and a third insert 39. The inserts 38 and 39 are threadably connected, and the insert 37 is held stationary axially within insert 38. The inserts 37, 38 and 39 are all considered as part of the housing 20, but are made as separate pieces for assembly of the various components of the blend back proportioning valve.

A pressure intensifying piston 40 is slidably disposed in the right end of the axial bore 21. The pressure intensifying piston includes a larger diameter portion 41 exposed to the pressure in the inlet port 27 and a smaller diameter portion 42 exposed to pressure in the outlet port 28. A fluid flow passage 43 extends axially from the left end of the pressure intensifying piston 40 for establishing fluid pressure communication between the inlet port 27 and the outlet port 28. An annular valve member 44 is formed by the left end of the pressure intensifying piston 40 surrounding the fluid flow passage 43. The lateral cross-sectional area differential of the pressure intensifying piston 40 (that is, the difference between the lateral cross-sectional area of the larger diameter portion 41 and the lateral cross-sectional area of the smaller diameter portion 42) is exposed to atmospheric pressure through an atmospheric vent passage 45 in the second insert 38. If desired, a suitable dust cap may be provided in the vent passage 45 to prevent contaminants from entering the right side of the axial bore 21.

A pressure reducing sleeve 50 is also slidably disposed in the axial bore 21. The pressure reducing sleeve 50 has its right end face exposed to fluid pressure in the outlet port 28 and has its left end face exposed to atmospheric pressure through the vent passage 45. The pressure reducing sleeve 50 carries two seals, one preventing fluid leakage between the sleeve 50 and the axial bore 21 and the other preventing fluid leakage between the sleeve 50 and the smaller diameter portion 42 of the pressure intensifying piston 40. The portion of the axial bore 21 in which the pressure reducing sleeve 50 is sealingly disposed is of greater diameter than the portion of the axial bore 21 in which the larger diameter portion 41 of the pressure intensifying piston 40 is sealingly disposed.

A first spring 55, acting through a washer 56, acts between the second insert 38 and the pressure reducing sleeve 50 to hold the pressure reducing sleeve 50 in the position shown in FIG. 2 when the master cylinder of the brake system is deactuated. The first spring 55 has a predetermined preload to prevent movement of the pressure reducing sleeve 50 and the pressure intensifying piston 40 until first predetermined inlet and outlet pressures are reached, as more fully explained below. The washer 56 and the pressure reducing sleeve 50 are held together under all conditions by the first spring 55 and by the pressure in the outlet port 28. The snap ring 57 is disposed in an axially extending slot 58 in the sleeve 50.

A second spring 59 acting through a washer 61 and through the washer 56 and a snap ring 57 extending radially outwardly from the pressure intensifying piston 40, acts against the pressure intensifying piston 40 to hold the pressure intensifying piston 40 in the position shown in FIG. 2 when the brakes are deactuated. The second spring 59 has a predetermined preload to prevent movement of the pressure intensifying piston 40 relative to the pressure reducing sleeve 50 until second predetermined inlet and outlet port pressures are reached, as explained in detail below. A cylindrical stop member 62 is also disposed in the axial bore 21 to limit movement of the pressure reducing sleeve 50 to the left as viewed in FIG. 2.

A valve seat 66, which may be formed of nylon or other suitable material, is spring biased to the position shown in FIG. 2 against the first insert 37 by a third spring 67. The third spring 67 is a light biasing spring so that a relatively small force can move the valve seat to the left as viewed in FIG. 2. A C-shaped spring clip 68 is also provided to prevent the spring 67 from pushing the valve seat 66 out of the switch piston 30 in which it is disposed in the event of movement of the switch piston 30 to the left as described above. A plurality of passages 69 are provided in the insert 37 to maintain open fluid pressure communication between the inlet port 27 and the valve member 44.

Turning now to the operation of the blend back proportioning valve shown in FIG. 2, it should first be understood that movement of the switch piston 30 to the left as viewed in FIG. 2 caused by a fluid pressure failure in the front brake circuit in the manner described above moves the valve seat 66 to the left away from the valve member 44. This renders the blend back proportioning valve inoperable and establishes open fluid pressure communication between the inlet port 27 and the outlet port 28 through the flow passage 43 at all pressures to provide full braking pressure to the rear wheel brakes in the event of a failure in the front wheel brakes. After the front brake circuit has been repaired, the switch piston 30 moves back to the position shown in FIG. 2 and the blend back proportioning valve operates in the manner described below.

Under low pressure application of the blend back proportioning valve, the preloads of the springs 55 and 59 hold the pressure reducing sleeve 50 and the pressure intensifying piston 40 in the positions shown in FIG. 2 so that the valve member 44 is axially spaced from the valve seat 66 and open fluid pressure communication from the inlet port 27 to the outlet port 28 is maintained through the flow passages 69 and through the flow passage 43. This portion of the operation of the valve is represented by line OA in FIG. 3.

When the inlet and outlet port pressures reach the first predetermined pressure at point A in FIG. 3, the pressure intensifying piston 40 is pushed to the left as viewed in FIG. 2 by the pressure reducing sleeve 50. This is because the area differential of the pressure intensifying piston 40 (that is, the difference between the lateral cross-sectional area of the larger diameter portion 41 and the lateral cross-sectional area of the smaller diameter portion 42) which is exposed to atmospheric pressure is smaller than the area of the pressure reducing sleeve 50 which is exposed to atmospheric pressure. Because of this, the force acting to the left on the pressure reducing sleeve 50 is greater than the force acting to the right on the pressure intensifying piston 40. The preload of the second spring 59 is great enough that the spring 59 will not yield during this portion of the operation of the valve. When the first predetermined pressures at point A are reached, this unbalanced force becomes great enough to overcome the preload of the first spring 55, and the pressure reducing sleeve 50 pushes the pressure intensifying piston 40 leftwardly as viewed in FIG. 2 until the valve member 44 moves close enough to the valve seat 66 to throttle fluid flow from the inlet port 27 to the outlet port 28. If fluid is flowing from the inlet port 27 to the outlet port 28, the valve member 44 will be slightly spaced from the valve seat to throttle such fluid flow, but if there is no flow from the inlet port 27 to the outlet port 28, the valve member 44 will engage the valve seat 66. The blend back proportioning valve, however, functions in the same manner whether or not there is fluid flow through the valve.

As the inlet port pressure continues to increase above point A in FIG. 3, the pressure reducing sleeve 50 maintains increases in the outlet port pressure proportional to but less than increases in inlet port pressure. This is because the preload of the second spring 59 prevents movement of the pressure intensifying piston 40 relative to the pressure reducing sleeve 50 during this portion of the operation of the valve so that the area of the larger diameter portion 41 which is exposed to inlet port pressure is less than the sum of the area of the pressure reducing sleeve 50 plus the area of the smaller diameter portion 42 exposed to outlet port pressure. This phase of the operation of the valve is shown by line AB in FIG. 3. The proportional relationship between the increase in inlet pressure and the increase in outlet pressure during this portion of the operation of the valve is the slope of the line AB and is equal to the proportional relationship between the area of the larger diameter portion 41 and the sum of the area of the sleeve 50 plus the area of the smaller diameter portion 42.

When the system pressures reach the second predetermined pressures at point B in FIG. 3, the pressure intensifying piston 40 begins to maintain increases in outlet port pressure proportional to but greater than increases in inlet port pressure. The preload and spring rate of the first spring 55 are such that the pressure reducing sleeve 50 engages the stop member 62 through the washer 56 at the second predetermined inlet and outlet pressures shown at point B. The preload of the second spring 59 is equal to the remainder of the second predetermined inlet port pressure at point B multiplied times the lateral cross-sectional area of the larger diameter portion 41 exposed to inlet port pressure minus the second predetermined outlet port pressure at point B multiplied times the lateral cross-sectional area of the smaller diameter portion 42 exposed to outlet port pressure, so that the second spring 59 prevents relative movement between the pressure reducing sleeve 50 and the pressure intensifying piston 40 until the second predetermined inlet and outlet pressures shown at point B are reached.

As the inlet pressure is increased above point B shown in FIG. 3, the outlet port pressure acting against the pressure reducing sleeve 50 maintains the pressure reducing sleeve 50 against the stop 62 until such time as the brakes are released. Because the pressure intensifying piston 40 has a larger area exposed to inlet port pressure and a smaller area exposed to outlet port pressure, further increases in inlet port pressure above point B will result in proportional but greater increases in outlet port pressure. This phase of the operation of the valve is shown by line BC in FIG. 3. The proportional relationship between the increase in inlet port pressure and the increase in outlet port pressure is the slope of the line BC in FIG. 3 and is equal to the proportional relationship between the area of the larger diameter portion 41 exposed to inlet port pressure and the area of the smaller diameter portion 42 exposed to outlet port pressure.

When the third predetermined inlet port and outlet port pressures shown at point C are reached, the blend back proportioning valve maintains further increases in outlet port pressure equal to further increases in inlet port pressure. This is because the valve seat 66 has a portion of its right end face exposed to outlet port pressure so that the valve seat 66 moves to the left away from the valve member 44 to equalize inlet and outlet port pressures whenever the pressure intensifying piston 40 tries to increase the outlet port pressure to a higher pressure value than the inlet port pressure. This portion of the operation of the valve is shown by line CD in FIG. 3. The slope of line CD is the same as the slope of line OA because increases in inlet and outlet pressures are equal along this line. However, even though the increases in inlet and outlet pressures are equal, the magnitude of the outlet pressure is slightly greater than the magnitude of the inlet pressure due to the light preload of the spring 67.

When point D is reached and the brakes of the vehicle are released, the inlet and outlet port pressures decrease along line DCAO. This is because, when inlet port pressure decreases, the outlet port pressure moves the valve seat 66 to the left away from the valve member 44 against the bias of the third spring 67 so that the outlet port pressure decreases when the inlet port pressure decreases. It should be noted that line DCA is spaced slightly above line AO, due to the small spring force of the third spring 67, and that the pressure intensifying piston 40 and pressure reducing spool 50 move back to the positions shown in FIG. 2 when point A is reached.

When the blend back proportioning valve shown in FIG. 2 is operating at any point along the line BC and the brakes are released to depressurize the inlet port pressure, the outlet port pressure remains substantially constant until the line CA is reached. This is because, when inlet port pressures decreases from any point along line BC, the outlet port pressure moves the pressure intensifying piston 40 and the valve seat 66 together to the left as viewed in FIG. 2. However, this leftward movement is stopped by engagement of the larger diameter portion 41 of the pressure intensifying piston 40 with the annular shoulder on the first insert 37. Because the smaller diameter portion 42 of the pressure intensifying piston 40 is of relatively small lateral cross-sectional area, this leftward movement of the pressure intensifying piston 40 and valve seat 66 does not increase the volume of the outlet port 28 by a sufficient amount to substantially decrease the pressure in the outlet port 28 until the line CAO is reached. When the line CAO is reached and pressure in the inlet port 27 continues to decrease, the outlet port pressure moves the valve seat 66 away from the valve member 44 so that further decreases in inlet port pressure are met by equal decreases in outlet port pressure so that the inlet and outlet pressures continue to decrease along line CAO. It should be noted that line CA is spaced slightly above line OA due to the small spring force of the third spring 67, and that the pressure intensifying piston 40 and pressure reducing sleeve 50 move back to the positions shown in FIG. 2 when point A is reached.

When the blend back proportioning valve is operating along the line AB and the brakes are released to depressurize the inlet port pressure, the inlet and outlet port pressures decrease along line BAO. This is because, during this portion of the operation of the valve along line AB the preload of the spring 59 prevents relative movement between the pressure intensifying piston 40 and the pressure reducing sleeve 50. Decreases in the inlet port pressure along line AB result in the outlet port pressure moving the pressure intensifying piston 40 and the pressure reducing sleeve 50 together with the valve seat 66 to the left, as viewed in FIG. 2. Because the combined lateral cross-sectional area of the pressure reducing sleeve 50 and the cross-sectional area of the portion 42 of the pressure intensifying piston 40 is relatively large, such slight movement to the left increases the volume of the outlet port 28 a sufficient amount to decrease the outlet port pressure along line BA. When point A is reached upon such depressurization and the inlet port pressure is further decreased, the outlet port pressure pushes the valve seat 66 away from the valve head 44 so that further decreases in inlet port pressure are met with equal decreases in outlet port pressure along line AO. It should be noted that line BA is spaced slightly above line AB, due to the small spring force of the third spring 67, and that the pressure intensifying piston 40 and pressure reducing spool 50 move back to the position shown in FIG. 2 when point A is reached.

What is claimed is:

1. A blend back proportioning valve comprising a housing having a bore therein, an inlet port and an outlet port in said housing, pressure intensifying piston means slidably disposed in said bore between said inlet port and said outlet port, a fluid flow passage extending axially from one end of said pressure intensifying piston means establishing fluid pressure communication between said inlet port and said outlet port, said pressure intensifying piston means including a larger diameter portion exposed to inlet port pressure and a smaller diameter portion exposed to outlet port pressure, an annular valve member defined by a portion of said larger diameter portion surrounding said fluid flow passage, annular pressure reducing sleeve means slidably disposed in said bore and having one end exposed to outlet port pressure, a first spring urging said pressure reducing sleeve means toward said outlet port, a second spring urging said pressure intensifying piston means toward said inlet port, a valve seat disposed in said bore and spaced from said annular valve member when said inlet port pressure is less than a first predetermined pressure, said pressure reducing sleeve means pushing said pressure intensifying piston means in a direction toward said inlet port against the bias of said first spring when said first predetermined inlet port pressure is reached in said inlet port, said pressure reducing sleeve means urging said annular valve member toward said valve seat and maintaining increases in outlet port pressure proportional to but less than increases in inlet port pressure when said inlet port pressure is greater than said first predetermined inlet port pressure and less than a second predetermined inlet port pressure, said pressure intensifying piston means acting against the bias of said second spring and maintaining increases in outlet port pressure proportional to but greater than increases in inlet port pressure when said inlet port pressure is greater than said second predetermined inlet port pressure and less than a third predetermined inlet port pressure.

2. A blend back proportioning valve as defined in claim 1 wherein said first spring also urges said pressure intensifying piston means toward said outlet port.

3. A blend back proportioning valve as defined in claim 1 wherein said second spring acts between said pressure reducing sleeve means and said pressure intensifying piston means.

4. A blend back proportioning valve as defined in claim 1 wherein said second spring has a preload, and said preload is equal to the remainder of the annular lateral cross-sectional area of said larger diameter portion of said pressure intensifying piston means multiplied times said second predetermined inlet port pressure minus the annular lateral cross-sectional area of said smaller diameter portion of said pressure intensifying piston means multiplied times the outlet port pressure which is reached when said inlet port pressure is at said second predetermined inlet port pressure, whereby said pressure intensifying piston means does not move against the bias of said second spring relative to said pressure reducing sleeve means until said second predetermined inlet port pressure is reached.

5. A blend back proportioning valve as defined in claim 1 including stop means limiting said movement of said pressure reducing sleeve means in a direction toward said inlet port when said inlet port pressure is at least as great as said second predetermined inlet port pressure.

6. A blend back proportioning valve as defined in claim 1 wherein said pressure reducing sleeve means includes another end, said pressure intensifying piston means includes a differential area intermediate said larger and smaller diameter portions, and said other end and said differential area are exposed to atmospheric pressure.

7. A blend back proportioning valve as defined in claim 6 wherein said other end of said pressure reducing sleeve means is of greater lateral cross-sectional area than said differential area of said pressure intensifying piston means.

8. A blend back proportioning valve as defined in claim 1 wherein said larger diameter portion of said pressure intensifying piston means is sealingly disposed in a first portion of said bore, said smaller diameter portion of said pressure intensifying piston means is sealingly disposed within said annular pressure reducing sleeve means, and said pressure reducing sleeve means is sealingly disposed in a second portion of said bore.

9. A blend back proportioning valve as defined in claim 8 wherein said second bore portion is of larger diameter than said first bore portion.

10. A blend back proportioning valve as defined in claim 1 including a third spring biasing said valve seat to a predetermined position in said bore spaced from said annular valve member when said inlet port pressure is less than said first predetermined inlet port pressure, and said valve seat is slidably disposed in said bore for movement away from said predetermined position against the bias of said third spring when said outlet port pressure exceeds said inlet port pressure by operation of said pressure intensifying piston means.

11. A blend back proportioning valve comprising a housing having a bore therein, an inlet port and an outlet port in said housing, pressure intensifying piston means slidably disposed in said bore between said inlet port and said outlet port, said pressure intensifying piston means including a larger diameter portion exposed to inlet port pressure and a smaller diameter portion exposed to outlet port pressure, annular pressure reducing sleeve means slidably disposed in said bore and having one end exposed to outlet port pressure, a first spring urging said pressure reducing sleeve means toward said outlet port, a second spring urging said pressure intensifying piston means toward said inlet port, said pressure reducing sleeve means pushing said pressure intensifying piston means in a direction toward said inlet port against the bias of said first spring when said first predetermined inlet port pressure is reached in said inlet port and maintaining increases in outlet port pressure proportional to but less than increases in inlet port pressure when said inlet port pressure is greater than said first predetermined inlet port pressure and less than intensifying piston means acting against the bias of said second spring and maintaining increases in outlet port pressure proportional to but greater than increases in inlet port pressure when said inlet port pressure is greater than said second predetermined inlet port pressure and less than a third predetermined inlet port pressure.

12. A blend back proportioning valve as defined in claim 11 wherein said second spring acts between said pressure reducing sleeve means and said pressure intensifying piston means.

13. A blend back proportioning valve as defined in claim 12 wherein said second spring has a preload, and said preload is equal to the net force of said inlet and outlet port pressures acting on said larger and smaller diameter portions respectively of said pressure intensifying piston means when said inlet port pressure is at said second predetermined inlet port pressure.

14. A blend back proportioning valve as defined in claim 13 wherein said first spring also urges said pressure intensifying piston means toward said outlet port.

15. A blend back proportioning valve as defined in claim 11 including stop means limiting said movement of said pressure reducing sleeve means in a direction toward said inlet port when said inlet port pressure is at and above said second predetermined inlet port pressure.

16. A blend back proportioning valve as defined in claim 11 wherein said larger diameter portion of said pressure intensifying piston means is sealingly disposed in a first portion of said bore, said smaller diameter portion of said pressure intensifying piston means is sealingly disposed within said annular pressure reducing sleeve means, said pressure reducing sleeve means is sealingly disposed in a second portion of said bore, and said second bore portion is of larger diameter than said first bore portion.

17. A blend back proportioning valve as defined in claim 11 wherein said pressure reducing sleeve means includes another end, said pressure intensifying piston means includes a differential area intermediate said larger and smaller diameter portions, said other end and said differential area are exposed to atmospheric pressure, and said other end of said pressure reducing sleeve means is of greater lateral cross-sectional area than said differential area of said pressure intensifying piston means.

* * * * *

UNITED STATES PATENT OFFICE
CERTIFICATE OF CORRECTION

Patent No. 3,832,007   Dated August 27, 1974

Inventor(s) Richard G. Thrush

It is certified that error appears in the above-identified patent and that said Letters Patent are hereby corrected as shown below:

On the Abstract page please change the name of Attorney, Agent or Firm to "McNenny, Farrington, Pearne & Gordon".

Column 10, Line 15, after "than" insert --a second predetermined inlet port pressure, said pressure--

Signed and sealed this 3rd day of December 1974.

(SEAL)
Attest:

McCOY M. GIBSON JR.
Attesting Officer

C. MARSHALL DANN
Commissioner of Patents